US012700727B2

(12) United States Patent
Chen et al.

(10) Patent No.: US 12,700,727 B2
(45) Date of Patent: Aug. 4, 2026

(54) FULL-FUNCTIONALITY BACK POWER PROTECTION (BPP) INPUT/OUTPUT (I/O) CIRCUIT WITH OVERVOLTAGE PROTECTION INCLUDING ELECTROSTATIC DISCHARGE

(71) Applicant: QUALCOMM Incorporated, San Diego, CA (US)

(72) Inventors: Wilson Jianbo Chen, San Diego, CA (US); Chiew-Guan Tan, San Diego, CA (US); Sreeker Dundigal, San Diego, CA (US)

(73) Assignee: QUALCOMM Incorproated, San Diego, CA (US)

( * ) Notice: Subject to any disclaimer, the term of this patent is extended or adjusted under 35 U.S.C. 154(b) by 340 days.

(21) Appl. No.: 18/508,052

(22) Filed: Nov. 13, 2023

(65) Prior Publication Data

US 2025/0158390 A1       May 15, 2025

(51) Int. Cl.
    *H02H 9/04*        (2006.01)
    *H02H 1/00*        (2006.01)
(52) U.S. Cl.
    CPC ............ *H02H 9/04* (2013.01); *H02H 1/0007* (2013.01)
(58) Field of Classification Search
    CPC ...... H02H 9/04; H02H 1/0007; H10D 89/921; H10D 89/819
    See application file for complete search history.

(56) References Cited

U.S. PATENT DOCUMENTS

| | | | |
|---|---|---|---|
| 6,522,511 B1 | 2/2003 | John et al. | |
| 7,518,844 B1 | 4/2009 | Xu et al. | |
| 8,659,859 B1 * | 2/2014 | Zhu ........................ | H02H 9/046 |
| | | | 361/111 |
| 11,296,502 B2 * | 4/2022 | Lai ......................... | H02H 9/046 |
| 2008/0285196 A1 * | 11/2008 | Hsiung ................ | H03K 17/223 |
| | | | 361/91.1 |
| 2012/0257317 A1 | 10/2012 | Abou-Khalil et al. | |
| 2013/0215541 A1 | 8/2013 | Karp | |
| 2014/0126089 A1 | 5/2014 | Chang et al. | |
| 2016/0225727 A1 | 8/2016 | Tseng et al. | |

(Continued)

FOREIGN PATENT DOCUMENTS

TW        200921888 A  *  5/2009

OTHER PUBLICATIONS

International Search Report and Written Opinion—PCT/US2024/047166—ISA/EPO—Dec. 11, 2024.

(Continued)

*Primary Examiner* — Monica Lewis
*Assistant Examiner* — Nicolas Bellido
(74) *Attorney, Agent, or Firm* — Loza & Loza, LLP

(57) ABSTRACT

An apparatus including: an overvoltage detector configured to generate an overvoltage indicating signal indicating whether a first voltage at an input/output (I/O) port is above an overvoltage threshold; a control circuit configured to generate a control signal based on the overvoltage indicating signal; a pseudo power source coupled to the I/O port and configured to provide a supply voltage for the control circuit; and a clamp circuit configured to generate a shunt current from the I/O port through an electrostatic discharge (ESD) protection diode, wherein the shunt current is enabled or disabled based on the control signal.

26 Claims, 6 Drawing Sheets

(56)     References Cited

U.S. PATENT DOCUMENTS

| | | |
|---|---|---|
| 2016/0225758 A1 | 8/2016 | Lai et al. |
| 2020/0266187 A1* | 8/2020 | Meng ..................... H02H 9/046 |
| 2021/0305809 A1 | 9/2021 | Hung et al. |
| 2022/0029413 A1* | 1/2022 | Lai ......................... H02H 9/046 |
| 2024/0250526 A1* | 7/2024 | Ahammed ........... H10D 89/611 |

OTHER PUBLICATIONS

Texas Instruments: "Eliminate Power Sequencing With Powered-Off Protection Signal Switches", Application Brief, SCDA015C, Jan. 2019, Revised on Apr. 2021, pp. 1-3.

* cited by examiner

1100

1200

1210
GENERATING AN OVERVOLTAGE INDICATING SIGNAL INDICATING WHETHER A VOLTAGE AT AN INPUT/OUTPUT (I/O) PORT IS ABOVE AN OVERVOLTAGE THRESHOLD

1220
GENERATING A CONTROL SIGNAL BASED ON THE OVERVOLTAGE INDICATING SIGNAL

1230
ENABLING OR DISABLING A SHUNTING OF CURRENT PRODUCED BY THE VOLTAGE FROM THE I/O PORT TO A VOLTAGE RAIL BASED ON THE CONTROL SIGNAL

FULL-FUNCTIONALITY BACK POWER PROTECTION (BPP) INPUT/OUTPUT (I/O) CIRCUIT WITH OVERVOLTAGE PROTECTION INCLUDING ELECTROSTATIC DISCHARGE

FIELD

Aspects of the present disclosure relate generally to multi-drop bus input/output (I/O) circuits, and in particular, to a full-functionality, back power protection (BPP) input/output (I/O) circuit with overvoltage protection including electrostatic discharge (ESD).

BACKGROUND

A multi-drop bus may be coupled to a set of integrated circuit (ICs) (or other components) to facilitate data/clock communications between the set of ICs. In some cases, one or more of the set of ICs may be turned off. It may be desirable for the multi-drop bus to remain in use to facilitate data/clock communications between those ICs that are on, while not affecting and/or being affected by those one or more ICs that are off.

SUMMARY

The following presents a simplified summary of one or more implementations in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations in a simplified form as a prelude to the more detailed description that is presented later.

An aspect of the disclosure relates to an apparatus. The apparatus includes: an overvoltage detector including an input coupled to an input/output (I/O) port; a control circuit including an input coupled to an output of the overvoltage detector; a pseudo power source including an input coupled to the I/O port, and an output coupled to the control circuit; and a clamp circuit coupled between the I/O port and a voltage rail, through a diode, wherein the clamp circuit includes an input coupled to an output of the control circuit.

Another aspect of the disclosure relates to an apparatus. The apparatus includes: an overvoltage detector configured to generate an overvoltage indicating signal indicating whether a first voltage at an input/output (I/O) port is above an overvoltage threshold; a control circuit configured to generate a control signal based on the overvoltage indicating signal; a pseudo power source coupled to the I/O port and configured to provide a supply voltage for the control circuit; and a clamp circuit configured to generate a shunt current from the I/O port through a diode, wherein the shunt current is enabled or disabled based on the control signal.

Another aspect of the disclosure relates to a method. The method includes: generating an overvoltage indicating signal indicating whether a voltage at an input/output (I/O) port is above an overvoltage threshold; generating a control signal based on the overvoltage indicating signal; and enabling or disabling a shunting of current produced by the voltage from the I/O port to a voltage rail based on the control signal.

Another aspect of the disclosure relates to an apparatus. The apparatus includes: means for generating an overvoltage indicating signal indicating whether a voltage at an input/output (I/O) port is above an overvoltage threshold; means for generating a control signal based on the overvoltage indicating signal; and means for enabling or disabling a shunting of current produced by the voltage from the I/O port to a voltage rail based on the control signal.

To the accomplishment of the foregoing and related ends, the one or more implementations include the features hereinafter fully described and particularly pointed out in the claims. The following description and the annexed drawings set forth in detail certain illustrative aspects of the one or more implementations. These aspects are indicative, however, of but a few of the various ways in which the principles of various implementations may be employed and the description implementations are intended to include all such aspects and their equivalents.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 3:
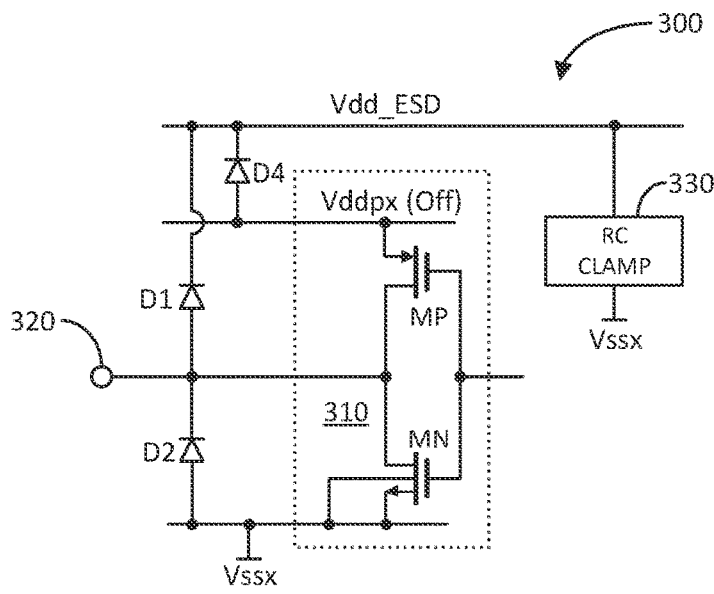
FIG. 3 illustrates a block/schematic diagram of example input/output (I/O) circuit in accordance with another aspect of the disclosure.

As described in the description, it may be desirable for the multi-drop bus to remain in use to facilitate data/clock communications between those ICs that are on, while not affecting and/or being affected by those one or more ICs that are off. To this end, an input/output (I/O) circuit needs to provide back power protection (BPP) as well as electrostatic discharge (ESD) protection. For example, I/O circuit 300 as shown in FIG. 3 can not only provide such protections, but also have a relatively small footprint and low current leakage. However, the I/O circuit 300 may not be able to differentiate normal data/clock bus signaling and an ESD event and thus it is not fully-functional with regards to the multi-drop bus as it cannot be used for data/clock communication.

In some implementations of the present invention, the I/O circuit includes an overvoltage detector coupled between the I/O port and the lower voltage rail Vssx, and the full-functionality (e.g., facilitating data/clock signaling on) of a multi-drop bus can be achieved by disabling a clamp circuit when the overvoltage indicating signal CLP_CTL generated by the overvoltage detector indicates that the voltage Vbus at the I/O port is consistent with data/clock communication signaling, and enabling the clamp circuit when the overvoltage indicating signal CLP_CTL generated by the overvoltage detector indicates that the voltage Vbus at the I/O port is above an overvoltage threshold (e.g., consistent with an ESD event or other overvoltage event)

Moreover, further improvement on the above inventive idea is also proposed. In some implementations, a pseudo power source for generating a supply voltage for the control circuit when the I/O circuit is powered down and no supply voltage is present at the upper voltage rail Vddpx.

Figure 1:
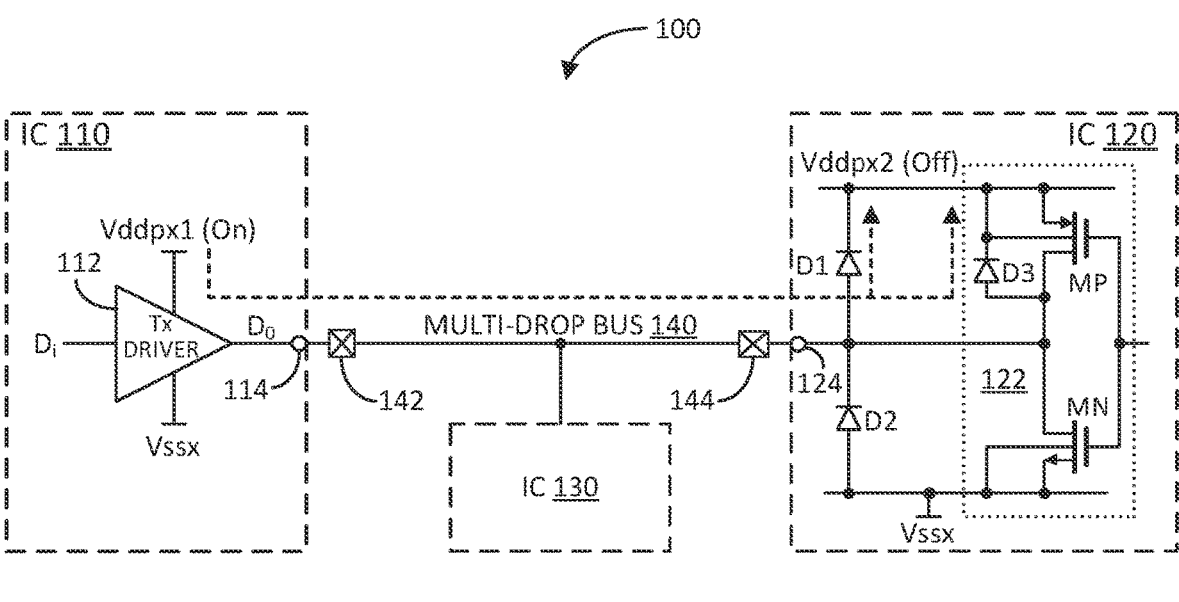
FIG. 1 illustrates a block diagram of an example data communication system in accordance with an aspect of the disclosure.

FIG. 1 illustrates a block diagram of an example data communication system 100 in accordance with an aspect of the disclosure. The data communication system 100 includes a first integrated circuit (IC) 110, a second IC 120, and a third IC 130, all coupled to a multi-drop bus 140. It shall be understood that there may be other ICs, circuits, components also coupled to the multi-drop bus 140. An access arbitration for use of the multi-drop bus 140 may be used by the components (e.g., ICs 110, 120, and 130) to access the multi-drop bus 140 for transmission of data or clock communication signaling to another one or more components on the multi-drop bus 140.

In this example, the first IC 110 includes a transmit (Tx) driver 112 configured to receive and process an input data signal $D_i$ (e.g., amplify, voltage level shift, etc.) to generate an output data signal $D_o$. The Tx driver 112 may be coupled to and receive power (e.g., supply voltage/current) from a first upper voltage rail Vddpx1 and a lower voltage rail Vssx (e.g., ground). The Tx driver 112 includes an output (e.g., where the output data signal $D_o$ is generated) coupled to an input/output (I/O) port (e.g., an IC pin) 114 which, in turn, is coupled to a bus pad 142 on the multi-drop bus 140. As discussed in more detail herein, the first IC 110 is powered on as indicated by the first upper voltage rail Vddpx1 being designated as "On". Further, in accordance with this example, the destination for the output data signal $D_o$ is the IC 130.

The second IC 120 also includes a transmit (Tx) driver 122, which includes a first field effect transistor (FET) MP (e.g., a p-channel FET) and a second FET MN (e.g., an n-channel FET) coupled in series between a second upper voltage rail Vddpx2 and the lower voltage rail Vssx (e.g., ground). In this example, the IC 120 may be turned off as indicated by the second upper voltage rail Vddpx2 being designated as "Off". The first FET MP includes a source and a bulk coupled to the second upper voltage rail Vddpx2, a gate coupled to a gate of the second FET MN, and a drain coupled to a drain of the second FET MN. The second MN includes a source and a bulk coupled to the lower voltage rail Vssx. The gates of the first and second FETs MP and MN serve as the input of the Tx driver 122; but since, in this example, the IC 120 is off, no data signal is shown as being applied to the input of the Tx driver 122. The drains of the first and second FETs MP and MN serve as the output of Tx driver 122, and is coupled to an I/O port (e.g., an IC pin) 124 which, in turn, is coupled to a bus pad 144 on the multi-drop bus 140.

The second IC 120 further includes electrostatic discharge (ESD) protection diodes D1 and D2. The first ESD protection diode D1 includes an anode coupled to the I/O port 124 and a cathode coupled to the second upper voltage rail Vddpx2. The second ESD protection diode D2 includes a cathode coupled to the I/O port 124 and an anode coupled to the lower voltage rail Vssx. For back power protection (BPP) as described further herein, a third (parasitic) diode D3 is shown between the p-doped drain and the n-doped bulk of the first FET MP.

In this example, the second IC 120 does not have back power protection (BPP). That is, when the Tx driver 112 of the first IC 110 is providing the output data signal $D_o$ to the multi-drop bus 140 for transmission to the IC 130, the current associated with a high logic level of the output data signal $D_o$ flows to the second upper voltage rail Vddpx2 via the ESD protection diode D1, as well as via the drain-bulk diode D3 of the first FET MP, as indicated by the dashed arrow lines, respectively. If the second upper voltage rail Vddpx2 is pulled down to Vssx (e.g., grounded) when the second IC 120 is off, the current flowing via the diodes D1/D3 and Vddpx2 to Vssx is relatively large; and thereby, corrupts the output data signal $D_o$ on the multi-drop bus 140. This makes it difficult or even impossible for the IC 130 to receive and detect the output data signal $D_o$. If the second upper voltage rail Vddpx2 is floating when the second IC 120 is off, the current flowing via the diodes D1/D3 may charge the second upper voltage rail Vddpx2 to an unknown voltage, and may unintendedly and/or unpredictably turn on other circuitry on the second upper voltage rail Vddpx2, which could cause a system malfunction (e.g., enabling a system reset circuit). The charging of the floating Vddpx2 may also consume power and may also corrupt the output data signal $D_o$.

Figure 2:
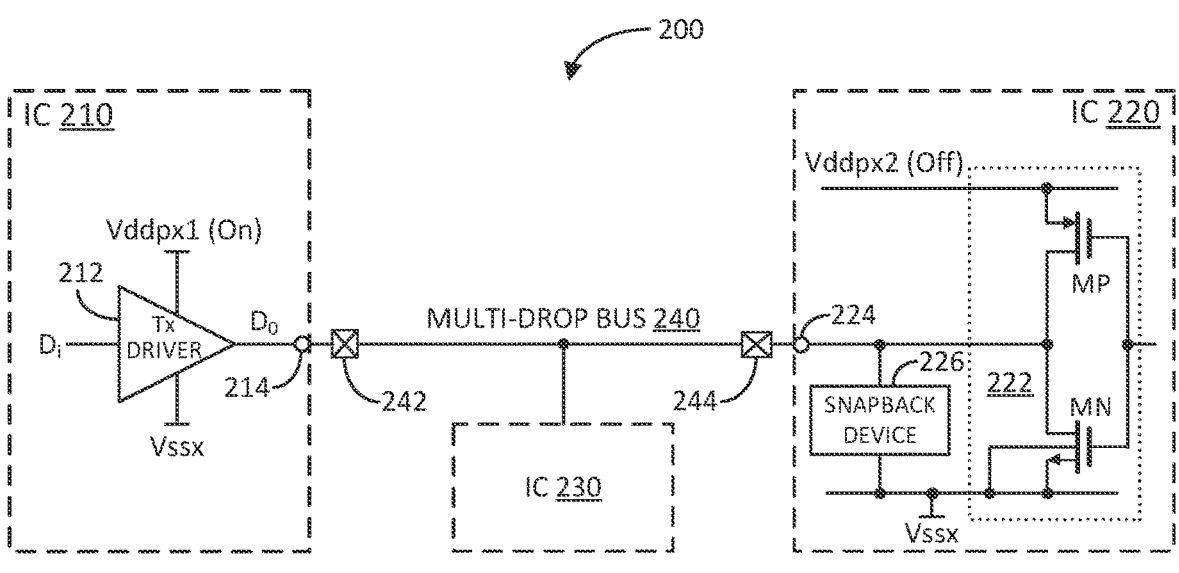
FIG. 2 illustrates a block diagram of another example data communication system in accordance with another aspect of the disclosure.

FIG. 2 illustrates a block diagram of another example data communication system 200 in accordance with another aspect of the disclosure. The data communication system 200 is similar to the data communication system 100 previously discussed. In particular, the data communication system 200 includes a first IC 210 including a Tx driver 212 configured to process an input data signal $D_i$ to generate an output data signal $D_o$. The Tx driver 212 is coupled to and receives power from a first upper voltage rail Vddpx1 (which is on), and a lower voltage rail Vssx (e.g., ground). The output of the Tx driver 212 is coupled to an I/O port (e.g., an IC pin) 214 which, in turn, is coupled to a bus pad 242 on a multi-drop bus 240. The multi-drop bus 240 is also coupled to a second IC 220 and a third IC 230. The second IC 220 includes a Tx driver 222 (e.g., FETs MP and MN, Bulk of MP connected to custom well tie) coupled between a second upper voltage rail Vddpx2 (which is off) and a lower voltage rail Vssx (e.g., ground). The output of the Tx driver 222 is coupled to an I/O port (e.g., an IC pin) 224 which, in turn, is coupled to a bus pad 244 on the multi-drop bus 240.

In this example, the second IC 220 is configured to have back power protection (BPP) to prevent or substantially reduce current associated with the output data signal $D_o$ on the multi-drop bus 240, which is intended for the third IC 230, from being drawn into the second IC 220 and cause the problems outlined above with respect to the BPP-deficient second IC 120. The second IC 220 has BPP because the ESD protection diodes D1 and D2 are no longer present to draw current from the multi-drop bus 240. For ESD protection, the second IC 220 includes a snapback device 226 coupled between the I/O port 224 and Vssx.

The snapback device 226 is a relatively large gate-grounded n-channel FET that breakdown and conducts when the voltage on the multi-drop bus 240 is significantly high, as in an ESD event. As the ESD protection diode D1 is no longer present, there is substantially no current resulting from the output data signal $D_o$ on the multi-drop bus 240 to flow into the second upper voltage rail Vddpx2 and cause the problems previously discussed. However, there are issues with the snapback device 226, including a relatively large footprint, significant current leakage, not well controlled/defined by IC foundries as it is not typically a standard cell, and may not be available in certain technology nodes.

FIG. 3 illustrates a block/schematic diagram of example input/output (I/O) circuit 300 in accordance with another aspect of the disclosure. The I/O circuit 300 may be an example of a circuit configured to provide a data or clock signal on a multi-drop bus for data or clock communication with one or more devices coupled to the multi-drop bus. An integrated circuit (IC) may include a plurality or set of such I/O circuit 300. In this example, the I/O circuit 300 provides back power protection (BPP) as well as electrostatic discharge (ESD) protection. However, the I/O circuit 300 provides such protections at the expense of the multi-drop bus not being fully functional.

The I/O circuit 300 includes a transmit (Tx) driver 310 (e.g., FETs MP and MN, Bulk of MP connected to custom well tie) coupled between an upper voltage rail Vddpx, which is off in this example, and a lower voltage rail Vssx (e.g., ground), with gates coupled together to form an input of the Tx driver 310, and drains coupled together to form an output of the Tx driver 310, as similarly discussed in detail with reference to Tx driver 122. The output of the Tx driver 310 is coupled to an I/O port 320 which, in turn is coupled to a multi-drop bus (not shown in FIG. 3).

The I/O circuit 300 includes a first ESD protection diode D1 including an anode coupled to the I/O port 320 and a cathode coupled to a floating bus Vdd_ESD. A floating bus is one not driven to a known voltage. The second ESD protection diode D2 includes a cathode coupled to the I/O port 320 and an anode coupled to the lower voltage rail Vssx. The I/O port 320 further includes a resistor-capacitor (RC) clamp 330 coupled between the floating bus Vdd_ESD and the lower voltage rail Vssx. Additionally, the I/O port 320 includes a fourth diode D4 including an anode coupled to the upper voltage rail Vddpx and a cathode coupled to the floating bus Vdd_ESD to provide a supply voltage to the RC clamp 330 when Vddpx is on.

In this example, the ESD protection diode D1 is not coupled to the upper voltage rail Vddpx; and thus, the I/O circuit 300 has back power protection (BPP) as any current from the multi-drop bus does not flow to the upper voltage rail Vddpx. However, when there is a toggling of the data or clock signal on the multi-drop bus, the rising transition of the toggling signal causes the voltage on the floating bus Vdd_ESD to similarly exhibit a rising edge; and thereby, causes the RC clamp 330 to conduct, and shunt the voltage/current to Vssx. In other words, the RC clamp 330 may not be able to differentiate normal data/clock bus signaling and an ESD event. Accordingly, the I/O circuit 300 provides BPP, but it is not fully-functional with regards to the multi-drop bus as it cannot be used for data/clock communication.

Figure 4:
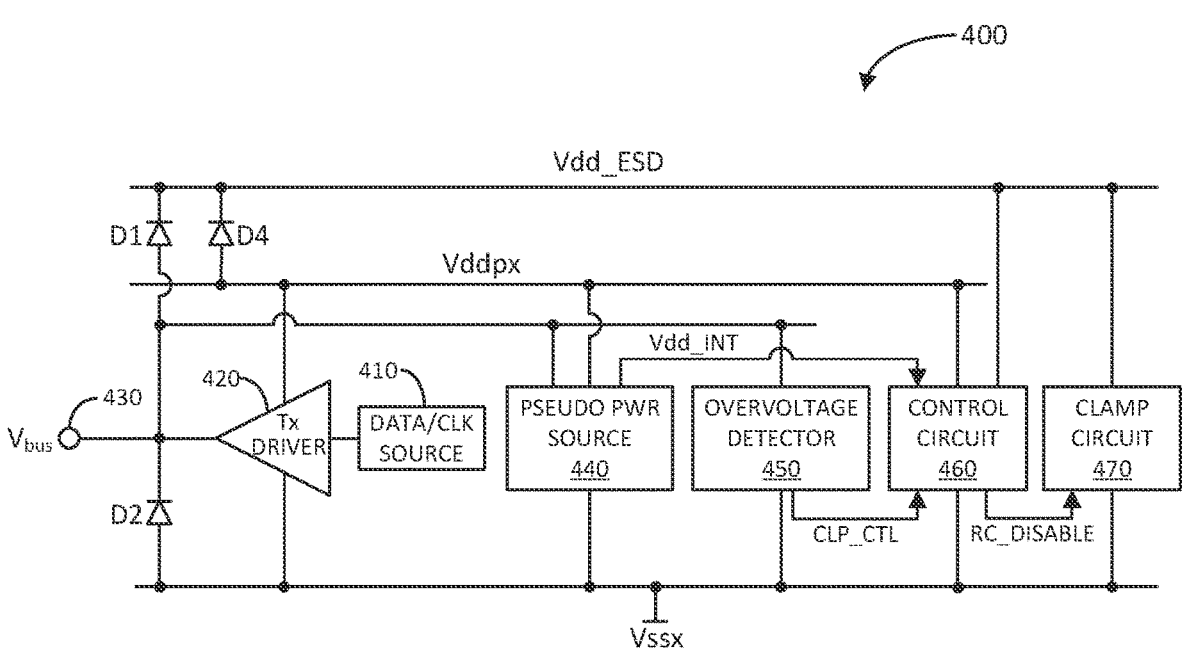
FIG. 4 illustrates a block diagram of another example input/output (I/O) circuit in accordance with another aspect of the disclosure.

FIG. 4 illustrates a block diagram of another example input/output (I/O) circuit 400 in accordance with another aspect of the disclosure. As discussed in more detail further herein, the I/O circuit 400 provides back power protection (BPP) without requiring a snapback device or power (e.g., supply voltage) from the upper voltage rail Vddpx, while also providing full-functionality of (e.g., facilitating data/clock signaling on) a multi-drop bus to which the I/O circuit 400 is coupled. The I/O circuit 400 achieves the aforementioned characteristics by disabling a clamp circuit when the voltage $V_{bus}$ on the multi-drop bus is consistent with data/clock communication signaling, and enabling the clamp circuit when the voltage $V_{bus}$ on the multi-drop bus is consistent with an ESD event (e.g., where the voltage $V_{bus}$ on the multi-drop bus is greater than an overvoltage threshold).

In particular, the I/O circuit 400 includes a transmit (Tx) driver 420 including an input coupled to a data or clock source 410, and an output coupled to an I/O port 430, which may be coupled to a multi-drop bus where a data (or clock) signal $D_o$ may be toggling in accordance with the transmission of the data (or clock) signal. The Tx driver 420 may be coupled to and receive power from an upper voltage rail Vddpx and a lower voltage rail Vssx (e.g., ground). The I/O circuit 400 further includes a first electrostatic discharge (ESD) protection diode D1 including an anode coupled to the I/O port 430 and a cathode coupled to a floating bus Vdd_ESD. Additionally, the I/O circuit 400 includes a second ESD protection diode D2 including a cathode coupled to the I/O port 430 and an anode coupled to the lower voltage rail Vssx. The I/O circuit 400 may optionally include another diode D4 including an anode coupled to the upper voltage rail Vddpx and a cathode coupled to the floating bus Vdd_ESD.

The I/O circuit 400 further includes a pseudo power source 440 coupled between the I/O port 430 and the lower voltage rail Vssx, and optionally, to the upper voltage rail Vddpx. A pseudo power source may be a power source that generates a supply voltage by rectifying a data, clock, or other type of signal. Further, the I/O circuit 400 includes an overvoltage detector 450 coupled between the I/O port 430 and the lower voltage rail Vssx. An overvoltage detector may be a detector that generates or asserts a signal when a monitored voltage exceeds a threshold voltage.

In addition, the I/O circuit 400 includes a control circuit 460 coupled between the upper voltage rail Vddpx and the lower voltage rail Vssx. The control circuit 460 includes a first input coupled to an output of the pseudo power source 440 to receive a supply voltage Vdd_INT therefrom, and a second input coupled to an output of the overvoltage detector 450 to receive an overvoltage indicating signal CLP_CTL therefrom. Further, the I/O circuit 400 includes a clamp circuit 470 (e.g., a resistor-capacitor (RC) clamp) coupled between the floating bus Vdd_ESD and the lower voltage rail Vssx, and the clamp circuit 470 includes an input coupled to an output of the control circuit 460 to receive a control signal RC_DISABLE therefrom.

In operation, the overvoltage indicating signal CLP_CTL generated by the overvoltage detector 450 indicates whether the voltage $V_{bus}$ at the I/O port 430 is consistent with data/clock communication signaling (e.g., if CLP_CTL<TH) or is consistent with an overvoltage (e.g., ESD) event (e.g., where CLP_CTL>TH). The control circuit 460, which is powered by the supply voltage Vdd_INT generated by the pseudo power source 440 based on the voltage $V_{bus}$ (e.g., data/clock communication signaling) at the I/O port 430, generates the control signal RC_DISABLE based on the overvoltage indicating signal CLP_CTL.

For example, if the overvoltage indicating signal CLP_CTL indicates that the voltage $V_{bus}$ at the I/O port 430 is consistent with data/clock communication signaling, the control circuit 460 generates the control signal RC_DIS-ABLE in an asserted state (e.g., sets it to a logic one (1)) to disable the clamp circuit 470. Thus, the clamp circuit 470 will not trigger (e.g., shunt current from the I/O port 430 to Vssx) based on data/clock communication signaling at the I/O port 430. If the overvoltage indicating signal CLP_CTL indicates that the voltage $V_{bus}$ at the I/O port 430 is above an overvoltage threshold (e.g., consistent with an ESD event or other overvoltage event), the control circuit 460 generates the control signal RC_DISABLE in a deasserted state (e.g., sets it to a logic zero (0)) to enable the clamp circuit 470. Thus, the clamp circuit 470 is able to trigger (e.g., shunt current from the I/O port 430 to Vssx) in response to an overvoltage event at the I/O port 430.

As the I/O circuit 400 may be powered down and no supply voltage is present at the upper voltage rail Vddpx, the pseudo power source 440 generates the supply voltage Vdd_INT by rectifying the voltage $V_{bus}$ at the I/O port 430. Thus, the clamp circuit 470 is disabled when there is a normal data/clock communication signaling on the multi-drop bus (e.g., the multi-drop bus may be fully-functional), and is enabled when there is an overvoltage (e.g., ESD) event on the multi-drop bus to provide overvoltage protection for the I/O circuit 400

Figure 5:
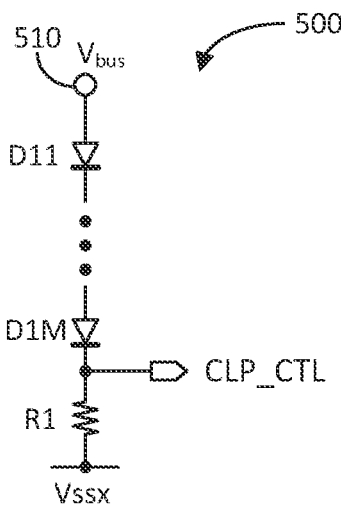
FIG. 5 illustrates a schematic diagram of an example overvoltage detector and associated operations graph in accordance with another aspect of the disclosure.
Figure 5:
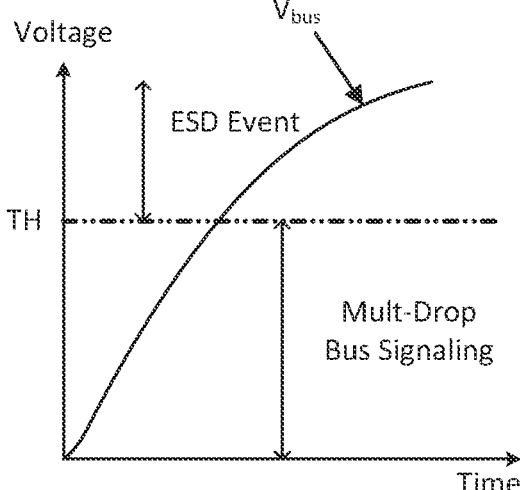

FIG. 5 illustrates a schematic diagram of an example overvoltage detector 500 in accordance with another aspect of the disclosure. The overvoltage detector 500 may be an example implementation of the overvoltage detector 450 of I/O circuit 400. The overvoltage detector 500 includes a set of one or more forward-biasing diodes D11 to DIM coupled in series with a resistive device R1 (e.g., a resistor, a transistor, a lossy inductor, etc.) between an I/O port 510 and a lower voltage rail Vssx. The overvoltage detector 500 is configured to generate the overvoltage indicating signal CLP_CTL as a voltage at a node between the set of one or more diodes D11 to DIM and the resistive device R1.

In operation, if the voltage $V_{bus}$ at the I/O port 510 is lower than the cumulative threshold voltage Vd (e.g., M*0.6 or 0.7 Volt (V)) of the set of one or more diodes D11 to DIM (e.g., as in the case where the voltage $V_{bus}$ is consistent with data/clock communication signaling on a multi-drop bus coupled to the I/O port 510), the set of one or more diodes D11 to D1M conduct substantially no current. In such case, the overvoltage indicating signal CLP_CTL is substantially zero (0) V. If the voltage $V_{bus}$ at the I/O port 510 is above the cumulative threshold voltage Vd of the set of one or more diodes D11 to DIM (e.g., as in the case where the voltage $V_{bus}$ is consistent with an overvoltage (e.g., ESD) event at the I/O port 510), the set of one or more diodes D11 to DIM conduct current. The current flows through the resistive device R1 to generate the overvoltage indicating signal CLP_CTL as a positive voltage (e.g., 200 to 300 milli Volts (mV)). As discussed further herein, a control circuit generates an asserted or deasserted control signal RC_DIS-ABLE in response to the overvoltage indicating signal CLP_CTL being substantially 0V or a positive voltage (e.g., 200 to 300 mV) above an overvoltage threshold.

FIG. 5 also depicts a voltage-time graph of the voltage $V_{bus}$ at the I/O port 510 associated with the operation of the overvoltage detector 500 as discussed. Thus, if the voltage $V_{bus}$ at the I/O port 510 is below an overvoltage threshold (TH) indicated as a horizontal double-dot-dash line on the graph, the voltage at the I/O port 510 is consistent with multi-drop bus signaling. If the voltage $V_{bus}$ at the I/O port 510 is above the overvoltage threshold (TH), the voltage at the I/O port 510 is consistent with an overvoltage (e.g., ESD) event.

Figure 6:
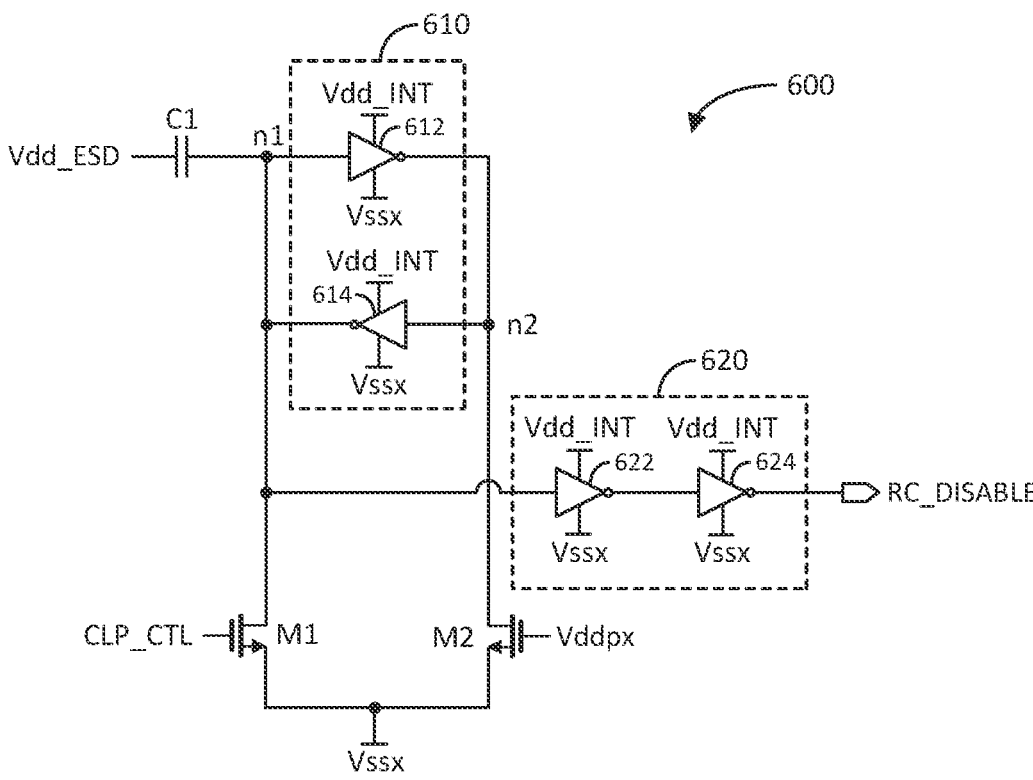
FIG. 6 illustrates a schematic diagram of an example resistor-capacitor (RC) clamp control circuit in accordance with another aspect of the disclosure.

FIG. 6 illustrates a schematic diagram of an example control circuit 600 in accordance with another aspect of the disclosure. The control circuit 600 may be an example implementation of the control circuit 460 of I/O circuit 400. The control circuit 600 includes an alternating-current (AC) coupling capacitor C1, a latch 610, a pair of transistors (e.g., field effect transistors (FETs), such as n-channel FETs) M1 and M2, and a buffer 620.

The AC coupling capacitor C1 is coupled between the floating bus Vdd_ESD and a first node n1. The latch 610 is coupled between the first node n1 and a second node n2. The latch 610, in turn, includes cross-coupled inverters 612 and 614 including respective input and output coupled to node n1, and respective output and input coupled to node n2. The cross-coupled inverters 612 and 614 are each coupled between and configured to receive power (e.g., a supply voltage Vdd_INT) from the pseudo power source 440 (or 700 discussed further herein) and the lower voltage rail Vssx. The transistors M1 and M2 (e.g., their drains and sources) are coupled between nodes n1 and n2 and the lower voltage rail Vssx, respectively. The transistor M1, which may be referred to generally as a circuit, includes a control input (e.g., gate) coupled to the overvoltage detector 450 or 500 to receive the overvoltage indicating signal CLP_CTL therefrom. The transistor M2, which may also be referred to generally as a circuit, includes a control input (e.g., gate) coupled to the upper voltage rail Vddpx.

The buffer 620 includes an input coupled to node n1 and an output, which may serve as the output of the control circuit 600, where the control signal RC_DISABLE is generated. The buffer 620 includes a set of cascaded inverters, where the example shown as two cascaded inverters 622 and 624 coupled between node n1 and the output. The cascaded inverters 622 and 624 are each coupled between and configured to receive power (e.g., the supply voltage Vdd_int) from the pseudo power source 440 (or 700 discussed further herein) and the lower voltage rail Vssx.

In operation, a bus voltage $V_{bus}$ consistent with data/clock communication signaling on a multi-drop bus AC couples to node n1 via the I/O port 430, ESD protection diode D1, Vdd_ESD bus, and AC coupling capacitor C1. The data/clock communication signaling initializes the latch 610 such that a logic one (1) is present at node n1 and a logic zero (0) is present at node n2. In this example, it is assumed that there is no ESD event at the I/O port 430 (e.g., CLP_CTL≈0V) and the upper voltage rail Vddpx is off (e.g., Vddpx≈0V). Thus, the transistors M1 and M2 are off. Accordingly, the buffer 620 outputs the logic one (1) state at node n1 to generate an asserted (e.g., logic one (1)) control signal RC_DISABLE to disable the clamp circuit 470 (or 800 as discussed further herein). Thus, the voltage $V_{bus}$ on the multi-drop bus consistent with data/clock communication signaling will not trigger the disabled clamp circuit 470 or 800.

If there is an overvoltage event at the I/O port 430 or 510, the overvoltage detector 450 or 500 generates the overvoltage indicating signal CLP_CTL at a positive voltage (e.g., 200-300 mV) substantially at or above the threshold voltage of transistor M1. This causes transistor M1 to turn on and pull down node n1 to flip the state of the latch 610, where node n1 is now at a logic zero (0) state and node n2 is at a logic one (1) state. Accordingly, the buffer 620 outputs the logic zero (0) at node n1 to generate a deasserted (e.g., logic zero (0)) control signal RC_DISABLE to enable the clamp circuit 470 or 800. Thus, the voltage $V_{bus}$ on the multi-drop bus is consistent with an overvoltage (e.g., ESD) event, and the enabled circuit clamp 470 or 800 is able to shunt current from the I/O port 430 to Vssx via ESD protection diode D1 and the floating bus Vdd_ESD for overvoltage (e.g., ESD) protection.

If there is a supply voltage on the upper voltage rail Vddpx (e.g., the corresponding IC is turned on), the corresponding supply voltage Vddpx turns on transistor M2 to configure the latch 610 to output a logic one (1) state at node n1 and a logic zero (0) state at node n2. The buffer 620 outputs the logic one (1) at node n1 to generate an asserted (e.g., logic one (1)) control signal RC_DISABLE to disable the clamp circuit 470 or 800. When the supply voltage Vddpx is present, there is no need for back power protection (BPP); and thus, the clamp circuit 470 or 800 may be disabled so as not to consume power.

Figure 7:
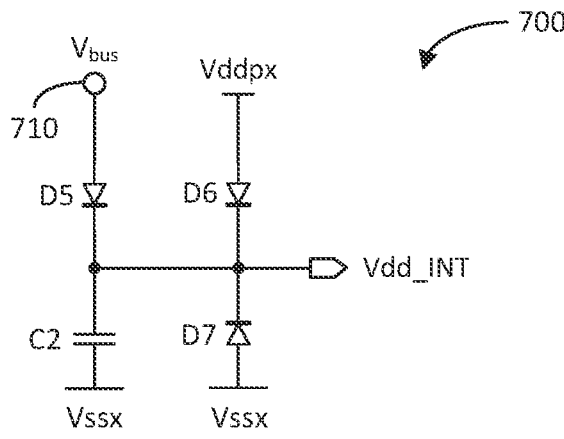
FIG. 7 illustrates a schematic diagram of an example pseudo power source in accordance with another aspect of the disclosure.

FIG. 7 illustrates a schematic diagram of an example pseudo power source 700 in accordance with another aspect of the disclosure. The pseudo power source 700 may be an example implementation of the pseudo power source 440 of I/O circuit 400. A pseudo power source is a power source that generates a supply voltage by rectifying a signal, such as a data signal or a clock signal.

The pseudo power source 700 includes a forward-biasing diode D5 coupled in series with a capacitor C2 between an I/O port 710 and a lower voltage rail Vssx (e.g., ground). The pseudo power source 700 may optionally include a forward-biasing diode D6 coupled in series with a reverse-biasing diode D7 between an upper voltage rail Vddpx and the lower voltage rail Vssx. The pseudo power source 700 is configured to generate a supply voltage Vdd_INT at an output node between the diode D5 and capacitor C2 (as well as between the diodes D6 and D7).

In operation, when there is no supply voltage at the upper voltage rail Vddpx (e.g., when the corresponding IC is off), the forward-biasing diode D5 conducts current in response to the voltage $V_{bus}$ (e.g., due to data/clock signaling and/or an ESD event) at the I/O port 710 to charge up the capacitor C2 to generate the supply voltage Vdd_INT. When the supply voltage is present at the upper voltage rail Vddpx, the supply voltage Vdd_INT is a diode drop below the supply voltage Vddpx. Accordingly, the latch 610 of the control circuit 600 remains powered on to produce an asserted control signal RC_DISABLE to disable the clamp circuit 470 or 800 as back power protection (BPP) may not be needed when the supply voltage Vddpx is present at the upper voltage rail Vddpx.

Figure 8:
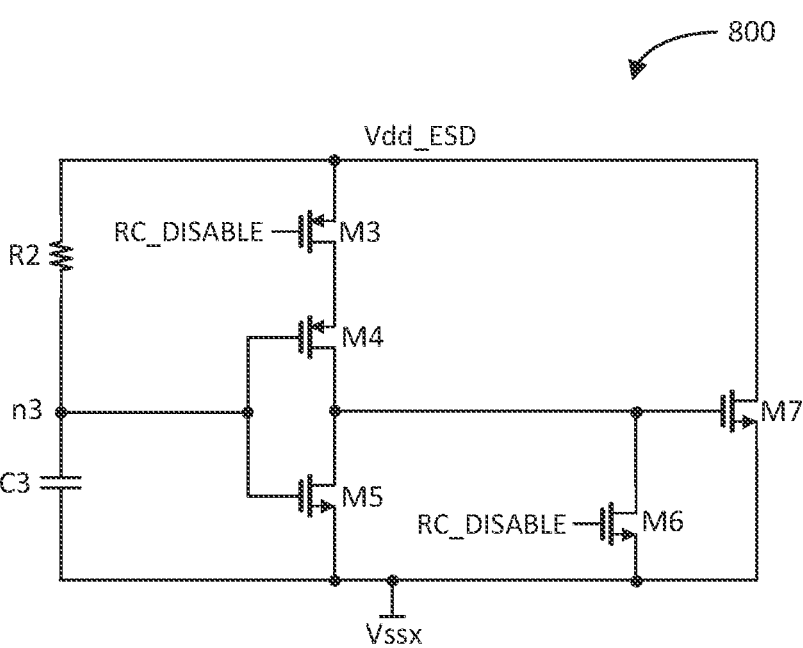
FIG. 8 illustrates a schematic diagram of an example resistor-capacitor (RC) clamp in accordance with another aspect of the disclosure.

FIG. 8 illustrates a schematic diagram of an example resistor-capacitor (RC) clamp 800 in accordance with another aspect of the disclosure. The RC clamp 800 may be an example implementation of the clamp circuit 470 of I/O circuit 400. It shall be understood that the clamp circuit 470 may be other types of clamp circuits, not necessarily an RC clamp circuit. The RC clamp 800 includes a resistive device R2 (e.g., a resistor, a transistor, a lossy inductor, etc.) coupled in series with a capacitor C3 between a floating bus Vdd_ESD and a lower voltage rail Vssx (e.g., ground).

Additionally, the RC clamp 800 includes a set of transistors M3, M4, and M5 (e.g., FETs or two (2) p-channel FETs and one (1) n-channel FET, respectively) coupled in series between the floating bus Vdd_ESD and the lower voltage rail Vssx. The control input (e.g., gate) of transistor M3 is coupled to the control circuit 460 or 600 to receive the control signal RC_DISABLE therefrom. The transistors M4 and M5 operate as an inverter with control inputs (e.g., gates) coupled to a node n3 between the resistive device R2 and the capacitor C3. The RC clamp 800 further includes another transistor M6 (e.g., FET or n-channel FET) coupled between an output of the inverter transistors M4 and M5 (e.g., at their common drains) and the lower voltage rail Vssx. The control input (e.g., gate) of transistor M6 is coupled to the control circuit 460 or 600 to receive the control signal RC_DISABLE therefrom. Additionally, the RC clamp 800 includes yet another transistor M7 (e.g., FET or n-channel FET) coupled between the floating bus Vdd_ESD and the lower voltage rail Vssx, with a control input (e.g., gate) coupled to the output (e.g., drains) of the inverter transistors M4 and M5.

In operation, when the control signal RC_DISABLE is asserted (e.g., indicating no overvoltage (e.g., ESD) event on the multi-drop bus or at the I/O port), the transistor M3 is off and the transistor M6 is on. The transistor M3 being off disables the inverter operation of the transistors M4 and M5, and the transistor M6 being on turns off the transistor M7. This disables the RC clamp 800, e.g., the RC clamp 800 is not able to shunt current from the floating bus Vdd_ESD to Vssx in response to voltage $V_{bus}$ related swings on the floating bus Vdd_ESD.

When the control signal RC_DISABLE is deasserted (e.g., indicating an overvoltage (e.g., ESD) event on the multi-drop bus or at the I/O port), the transistor M3 is on and the transistor M6 is off. The transistor M3 being on enables the inverter operation of the transistors M4 and M5, and the transistor M6 being off allows the gate of transistor M7 to be driven by the inverter M4/M5. As the voltage at node n3 has not been charged yet, the inverter M4/M5 outputs a logic high voltage to turn on transistor M7, and shunt current related to the overvoltage event from the floating bus Vdd_ESD to Vssx. When the capacitor C3 charges to a logic high voltage via the resistive device R2 due to the overvoltage on the floating bus Vdd_ESD bus, the inverter M4/M5 outputs a logic low voltage to turn off the transistor M7. Thus, the overvoltage protection is provided for a time window dictated by the time constant R2*C3, where R2 also represents the resistance of the resistive device R2 and C3 also represents the capacitance of the capacitor C3.

Figure 9:
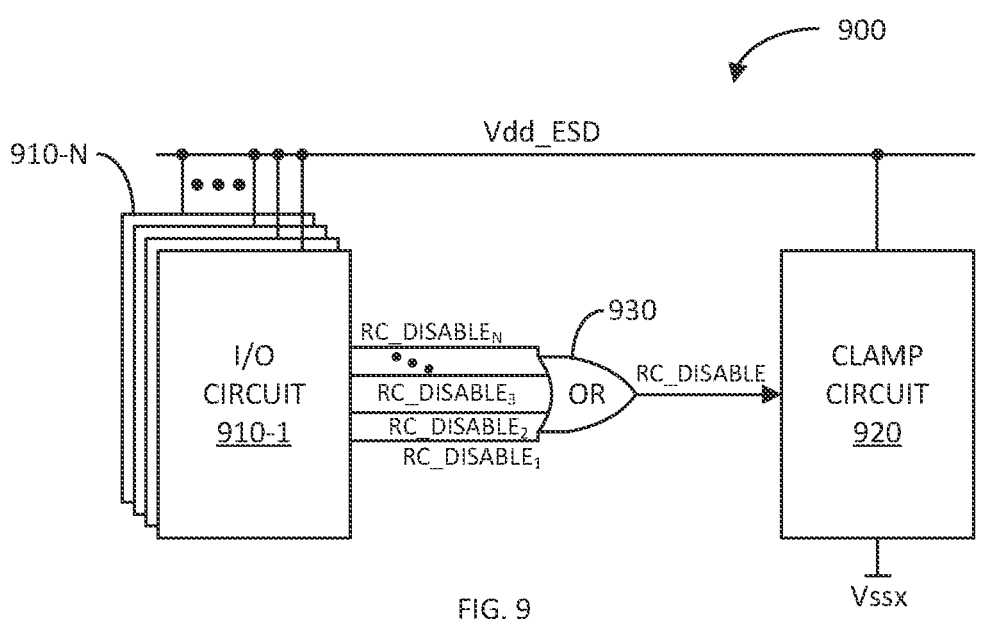
FIG. 9 illustrates a block diagram of an example integrated circuit (IC) in accordance with another aspect of the disclosure.

FIG. 9 illustrates a block diagram of an example integrated circuit (IC) 900 in accordance with another aspect of the disclosure. The IC 900 includes a set of N input/output (I/O) circuits 910-1 to 910-N coupled to a common floating bus Vdd_ESD. The IC 900 further includes a common clamp circuit 920 (e.g., an RC clamp) coupled between the common floating bus Vdd_ESD and a lower voltage rail Vssx (e.g., ground). Each of the set of I/O circuits 910-1 to 910-N may be implemented per I/O circuit 400 with the exception that the floating bus Vdd_ESD and the clamp circuit 470 are common to the set of I/O circuits 910-1 to 910-N. The set of I/O circuits 910-1 to 910-N are configured to generate a set of N control signals RC_DISABLE₁ to RC_DISABLE_N, respectively.

The IC 900 further includes a logic circuit 930 including inputs coupled to outputs of the set of I/O circuits 910-1 to 910-N to receive the set of control signals RC_DISABLE$_1$ to RC_DISABLE$_N$ therefrom, respectively. The logic circuit 930 is configured to perform an OR operation on the set of control signals RC_DISABLE$_1$ to RC_DISABLE$_N$ to generate a common control signal RC_DISABLE. The RC clamp 920 includes an input coupled to an output of the logic circuit 930 to receive the common control signal RC_DIS-ABLE. Thus, if any of the set of I/O circuits 910-1 to 910-N detect an overvoltage (e.g., ESD) event, the common control signal RC_DISABLE becomes deasserted; and responsively, the clamp circuit 920 becomes enabled to shunt the current associated with the overvoltage event from the common floating bus Vdd_ESD to the lower voltage rail Vssx. Otherwise, if none of the set of I/O circuits 910-1 to 910-N detect an overvoltage event, the common control signal RC_DISABLE remains asserted; and responsively, the clamp circuit 920 remains disabled so as not to respond to a voltage on the common floating bus Vdd_ESD.

Figure 10:
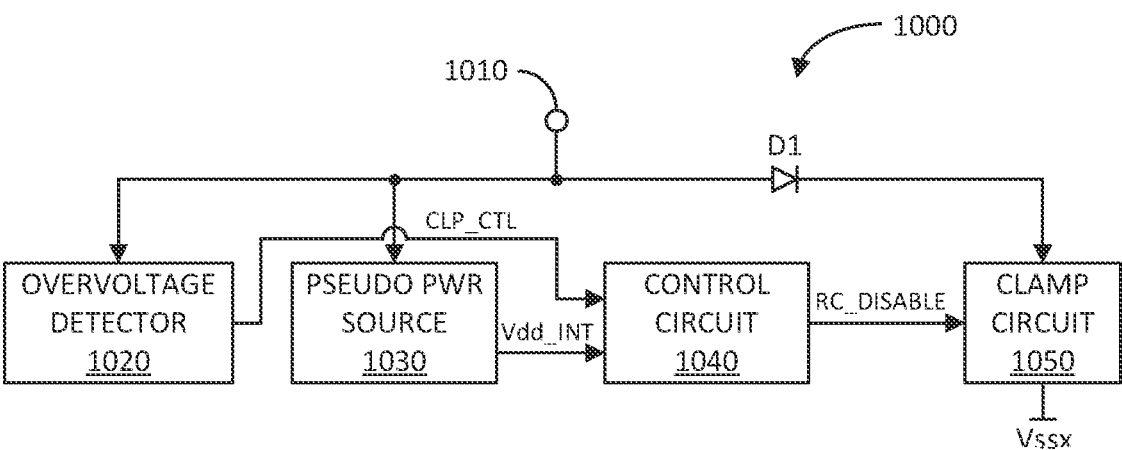
FIG. 10 illustrates a block diagram of another example input/output (I/O) circuit in accordance with another aspect of the disclosure.

FIG. 10 illustrates a block diagram of another example input/output (I/O) circuit 1000 in accordance with another aspect of the disclosure. The I/O circuit 1000 includes an overvoltage detector 1020 including an input coupled to an input/output (I/O) port 1010. The I/O circuit 1000 further includes a control circuit 1040 including an input coupled to an output of the overvoltage detector 1020. The I/O circuit 1000 further includes a pseudo power source 1030 including an input coupled to the I/O port 1010, and an output coupled to the control circuit 1040. Additionally, the I/O circuit 1000 includes a clamp circuit 1050 coupled between the I/O port 1010 and a voltage rail Vssx through an ESD protection diode D1, wherein the clamp circuit 1050 includes an input coupled to an output of the control circuit 1040.

Figure 11:
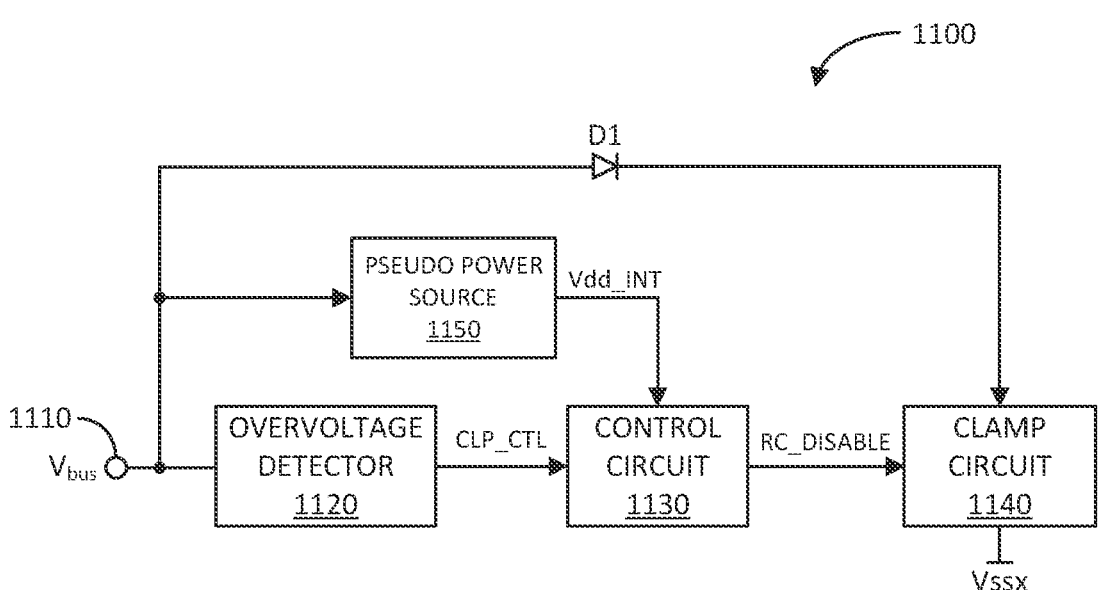
FIG. 11 illustrates a block diagram of another example input/output (I/O) circuit in accordance with another aspect of the disclosure.

FIG. 11 illustrates a block diagram of another example input/output (I/O) circuit 1100 in accordance with another aspect of the disclosure. The I/O circuit 1100 includes an overvoltage detector 1120 configured to generate an over-voltage indicating signal CLP_CTL indicating whether a voltage V$_{bus}$ at an input/output (I/O) port 1110 is above an overvoltage threshold. The I/O circuit 1100 further includes a control circuit 1130 configured to generate a control signal RC_DISABLE based on the overvoltage indicating signal CLP_CTL. Further, the I/O circuit 1100 includes a pseudo power source 1150 coupled to the I/O port 1110 and configured to provide a supply voltage Vdd_INT for the control circuit 1130. Additionally, the I/O circuit 1100 includes a clamp circuit 1140 configured to generate a shunt current from the I/O port through an ESD protection diode D1, wherein the shunt current is enabled or disabled based on the control signal RC_DISABLE.

Figure 12:
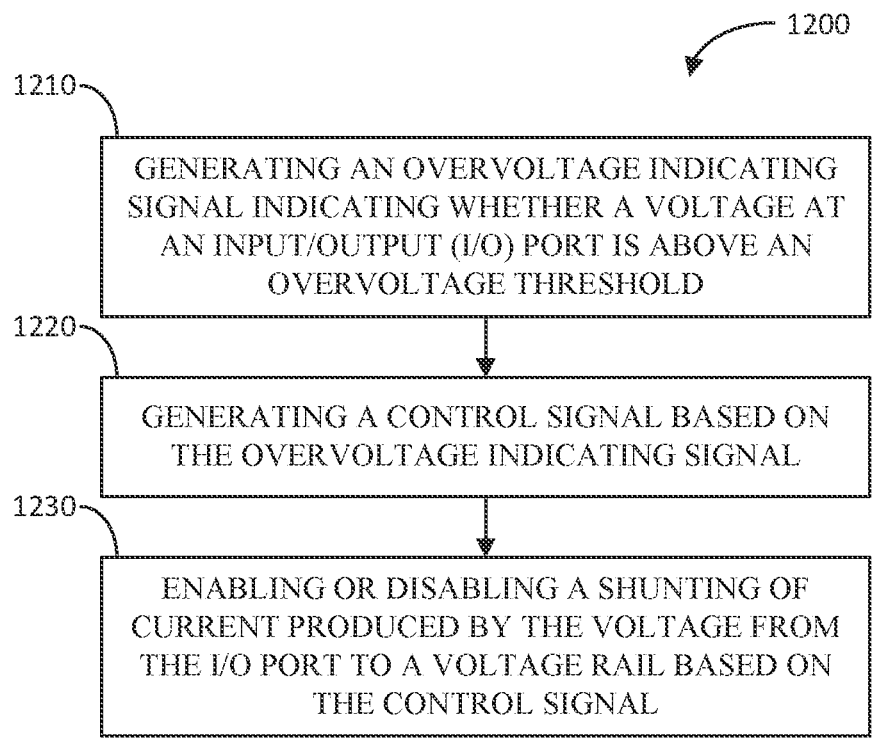
FIG. 12 illustrates a flow diagram of an example method of providing overvoltage protection for an input/output (I/O) circuit in accordance with another aspect of the disclosure.

FIG. 12 illustrates a flow diagram of an example method 1200 of providing overvoltage protection for an input/output (I/O) circuit in accordance with another aspect of the disclosure. The method 1200 includes generating an overvolt-age indicating signal indicating whether a voltage at an input/output (I/O) port is above an overvoltage threshold (block 1210). Examples of means for generating an overvoltage indicating signal indicating whether a voltage at an input/output (I/O) port is above an overvoltage threshold includes any of the overvoltage detectors described herein.

The method 1200 further includes generating a control signal based on the overvoltage indicating signal (block 1220). Examples of means for generating a control signal based on the overvoltage indicating signal include any of the RC clamp control circuits described herein. Additionally, the method 1200 includes enabling or disabling a shunting of current produced by the voltage from the I/O port to a voltage rail based on the control signal (block 1230). Examples of means for enabling or disabling a shunting of current produced by the voltage from the I/O port to a voltage rail based on the control signal include any of the clamp circuits described herein.

The method 1200 may further include generating a supply voltage for generating the control signal based on the voltage at the I/O port. Examples of means for generating a supply voltage include any of the pseudo power sources described herein. Further, according to the method 1200, generating the control signal may include initializing the control signal to a first state based on the voltage at the I/O port; and setting the control signal to a second state in response to the overvoltage indicating signal. Examples of means for initializing the control signal to a first state based on the voltage at the I/O port includes any of the latches described herein. An example of means for setting the control signal to a second state in response to the overvolt-age indicating signal includes circuit or transistor M1.

The following provides an overview of aspects of the present disclosure:

Aspect 1: An apparatus, comprising: an overvoltage detector including an input coupled to an input/output (I/O) port; a control circuit including an input coupled to an output of the overvoltage detector; a pseudo power source includ-ing an input coupled to the I/O port, and an output coupled to the control circuit; and a clamp circuit coupled between the I/O port and a voltage rail, through a diode, wherein the clamp circuit includes an input coupled to an output of the control circuit.

Aspect 2: The apparatus of aspect 1, further comprising a floating bus coupled between the diode and the clamp circuit.

Aspect 3: The apparatus of aspect 1 or 2, wherein the overvoltage detector comprises a set of one or more diodes coupled in series with a resistive device between the I/O port and the voltage rail, wherein a node between the set of one or more diodes and the resistive device is coupled to or serves as the output of the overvoltage detector.

Aspect 4: The apparatus of any one of aspects 1-3, wherein the pseudo power source comprises a first diode coupled in series with a capacitor between the I/O port and the voltage rail, wherein a node between the first diode and the capacitor is coupled to or serves as the output of the pseudo power source.

Aspect 5: The apparatus of aspect 4, wherein the pseudo power source further comprises a second diode coupled between another voltage rail and the node, and a third diode coupled between the node and the voltage rail.

Aspect 6: The apparatus of any one of aspects 1-5, wherein the control circuit comprises: a capacitor coupled between the diode and a first node; a latch coupled between the first node and a second node; and a first transistor coupled between the first node and the voltage rail, wherein the first transistor includes a control input coupled to or serving as the input of the control circuit.

Aspect 7: The apparatus of aspect 6, wherein the latch comprises cross-coupled inverters coupled between the first and second nodes.

Aspect 8: The apparatus of aspect 6 or 7, wherein the latch is coupled to the output of the pseudo power source.

Aspect 9: The apparatus of any one of aspects 6-8, wherein the control circuit further comprises a buffer includ-ing an input coupled to the first node, and an output coupled to or serving as the output of the control circuit.

Aspect 10: The apparatus of aspect 9, wherein the buffer comprises a set of cascaded inverters coupled between the first node and the output of the buffer.

Aspect 11: The apparatus of aspect 9 or 10, wherein the buffer is coupled to the output of the pseudo power source.

Aspect 12: The apparatus of any one of aspects 6-11, wherein the control circuit comprises a second transistor coupled between the second node and the voltage rail, wherein the second transistor includes a control input coupled to another voltage rail.

Aspect 13: The apparatus of any one of aspects 1-12, wherein the clamp circuit comprises: a resistive device coupled in series with a capacitor between the diode and the voltage rail; a first transistor, a second transistor, and a third transistor coupled in series between the diode and the voltage rail, wherein the first transistor includes a control input coupled to or serving as the input of the clamp circuit, wherein the second and third transistors include control inputs coupled to a first node between the resistive device and the capacitor; a fourth transistor coupled between a second node between the second and third transistors and the voltage rail, wherein the fourth transistor includes a control input coupled to or serving as the input of the clamp circuit; and a fifth transistor coupled between the diode and the voltage rail, wherein the fifth transistor includes a control input coupled to the second node.

Aspect 14: The apparatus of any one of aspects 1-13, further comprising: a data or clock source; a transmit driver including an input coupled to the data or clock source, and an output coupled to the I/O port, wherein the transmit driver is coupled between another voltage rail and the voltage rail; another diode coupled between the I/O port and the voltage rail; and a diode coupled between another voltage rail and the clamp circuit.

Aspect 15: An apparatus, comprising: an overvoltage detector configured to generate an overvoltage indicating signal indicating whether a first voltage at an input/output (I/O) port is above an overvoltage threshold; a control circuit configured to generate a control signal based on the overvoltage indicating signal; a pseudo power source coupled to the I/O port and configured to provide a supply voltage for the control circuit; and a clamp circuit configured to generate a shunt current from the I/O port through a diode, wherein the shunt current is enabled or disabled based on the control signal.

Aspect 16: The apparatus of aspect 15, wherein the pseudo power source is configured to generate the supply voltage from communication signaling at the I/O port.

Aspect 17: The apparatus of aspect 15 or 16, wherein the overvoltage detector comprises a set of one or more diodes coupled in series with a resistive device between the I/O port and a voltage rail, wherein the overvoltage indicating signal is or based on a second voltage at a node between the set of one or more diodes and the resistive device.

Aspect 18: The apparatus of any one of aspects 15-17, wherein the pseudo power source comprises a diode coupled in series with a capacitor between the I/O port and a voltage rail, wherein the supply voltage is or based on a second voltage at a node between the diode and the capacitor.

Aspect 19: The apparatus of any one of aspects 15-18, wherein the control circuit comprises: a latch configured to initialize the control signal to a first state based on the first voltage at the I/O port; and a circuit configured to flip the latch to set the control signal at a second state in response to the overvoltage indicating signal.

Aspect 20: The apparatus of aspect 19, wherein the clamp circuit is configured to be: disabled based on the first state of the control signal; or enabled based on the second state of the control signal.

Aspect 21: The apparatus of aspect 20, wherein the clamp circuit is configured to: not respond to the first voltage at the I/O port when it is disabled; or shunt current from the I/O port to a voltage rail in response to the first voltage when it is enabled.

Aspect 22: A method, comprising: generating an overvoltage indicating signal indicating whether a voltage at an input/output (I/O) port is above an overvoltage threshold; generating a control signal based on the overvoltage indicating signal; and enabling or disabling a shunting of current produced by the voltage from the I/O port to a voltage rail based on the control signal.

Aspect 23: The method of aspect 22, wherein generating the overvoltage indicating signal comprises applying the voltage across a set of one or more diodes coupled in series with a resistive device between I/O port and the voltage rail.

Aspect 24: The method of aspect 22 or 23, further comprising generating a supply voltage for generating the control signal based on the voltage at the I/O port.

Aspect 25: The method of aspect 24, wherein generating the supply voltage comprises applying the voltage at the I/O port across a diode coupled in series with a capacitor between the I/O port and the voltage rail.

Aspect 26: The method of any one of aspects 22-25, wherein generating the control signal comprises: initializing the control signal to a first state based on the voltage at the I/O port; and setting the control signal to a second state in response to the overvoltage indicating signal.

Aspect 27: The method of aspect 26, wherein enabling or disabling the shunting of the current, comprises: disabling the shunting of the current based on the first state of the control signal; or enabling the shunting of the current based on the second state of the control signal.

Aspect 28: An apparatus, comprising: means for generating an overvoltage indicating signal indicating whether a voltage at an input/output (I/O) port is above an overvoltage threshold; means for generating a control signal based on the overvoltage indicating signal; and means for enabling or disabling a shunting of current produced by the voltage from the I/O port to a voltage rail based on the control signal.

Aspect 29: The apparatus of aspect 28, further comprising means for generating a supply voltage based on the voltage at the I/O port, wherein the means for generating the control signal is coupled to the means for generating the supply voltage.

Aspect 30: The apparatus of aspect 28 or 29, wherein the means for generating the control signal comprises: means for initializing the control signal to a first state based on the voltage at the I/O port; and means for setting the control signal to a second state in response to the overvoltage indicating signal.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed:

1. An apparatus, comprising:

an overvoltage detector including an input coupled to an input/output (I/O) port;

a control circuit including an input coupled to an output of the overvoltage detector;

a pseudo power source including an input coupled to the I/O port, and an output coupled to the control circuit; and a clamp circuit coupled between the I/O port and a voltage rail, through a diode, wherein the clamp circuit includes an input coupled to an output of the control circuit, wherein the pseudo power source comprises a first diode coupled in series with a capacitor between the I/O port and the voltage rail, wherein a node between the first diode and the capacitor is coupled to or serves as the output of the pseudo power source.

2. The apparatus of claim 1, further comprising a floating bus coupled between the diode and the clamp circuit.

3. The apparatus of claim 1, wherein the overvoltage detector comprises a set of one or more diodes coupled in series with a resistive device between the I/O port and the voltage rail, wherein a node between the set of one or more diodes and the resistive device is coupled to or serves as the output of the overvoltage detector.

4. The apparatus of claim 1, wherein the pseudo power source further comprises a second diode coupled between another voltage rail and the node, and a third diode coupled between the node and the voltage rail.

5. The apparatus of claim 1, wherein the control circuit comprises:

a capacitor coupled between the diode and a first node;

a latch coupled between the first node and a second node; and a first transistor coupled between the first node and the voltage rail, wherein the first transistor includes a control input coupled to or serving as the input of the control circuit.

6. The apparatus of claim 5, wherein the latch comprises cross-coupled inverters coupled between the first and second nodes.

7. The apparatus of claim 5, wherein the latch is coupled to the output of the pseudo power source.

8. The apparatus of claim 5, wherein the control circuit further comprises a buffer including an input coupled to the first node, and an output coupled to or serving as the output of the control circuit.

9. The apparatus of claim 8, wherein the buffer comprises a set of cascaded inverters coupled between the first node and the output of the buffer.

10. The apparatus of claim 8, wherein the buffer is coupled to the output of the pseudo power source.

11. The apparatus of claim 5, wherein the control circuit comprises a second transistor coupled between the second node and the voltage rail, wherein the second transistor includes a control input coupled to another voltage rail.

12. The apparatus of claim 1, wherein the clamp circuit comprises:

a resistive device coupled in series with a capacitor between the diode and the voltage rail;

a first transistor, a second transistor, and a third transistor coupled in series between the diode and the voltage rail, wherein the first transistor includes a control input coupled to or serving as the input of the clamp circuit, wherein the second and third transistors include control inputs coupled to a first node between the resistive device and the capacitor;

a fourth transistor coupled between a second node between the second and third transistors and the voltage rail, wherein the fourth transistor includes a control input coupled to or serving as the input of the clamp circuit; and a fifth transistor coupled between the diode and the voltage rail, wherein the fifth transistor includes a control input coupled to the second node.

13. The apparatus of claim 1, further comprising:

a data or clock source;

a transmit driver including an input coupled to the data or clock source, and an output coupled to the I/O port, wherein the transmit driver is coupled between another voltage rail and the voltage rail;

another diode coupled between the I/O port and the voltage rail; and a diode coupled between another voltage rail and the clamp circuit.

14. An apparatus, comprising:

an overvoltage detector configured to generate an overvoltage indicating signal indicating whether a first voltage at an input/output (I/O) port is above an overvoltage threshold;

a control circuit configured to generate a control signal based on the overvoltage indicating signal;

a pseudo power source coupled to the I/O port and configured to provide a supply voltage for the control circuit; and a clamp circuit configured to generate a shunt current from the I/O port through an electrostatic discharge (ESD) protection diode, wherein the shunt current is enabled or disabled based on the control signal, wherein the control circuit comprises a latch configured to initialize the control signal to a first state based on the first voltage at the I/O port, and a circuit configured to flip the latch to set the control signal at a second state in response to the overvoltage indicating signal.

15. The apparatus of claim 14, wherein the pseudo power source is configured to generate the supply voltage from communication signaling at the I/O port.

16. The apparatus of claim 14, wherein the overvoltage detector comprises a set of one or more diodes coupled in series with a resistive device between the I/O port and a voltage rail, wherein the overvoltage indicating signal is or based on a second voltage at a node between the set of one or more diodes and the resistive device.

17. The apparatus of claim 14, wherein the pseudo power source comprises a diode coupled in series with a capacitor between the I/O port and a voltage rail, wherein the supply voltage is or based on a second voltage at a node between the diode and the capacitor.

18. The apparatus of claim 14, wherein the clamp circuit is configured to be:

disabled based on the first state of the control signal; or enabled based on the second state of the control signal.

19. The apparatus of claim 18, wherein the clamp circuit is configured to:

not respond to the first voltage at the I/O port when it is disabled; or shunt current from the I/O port to a voltage rail in response to the first voltage when it is enabled.

20. A method, comprising:

generating an overvoltage indicating signal indicating whether a voltage at an input/output (I/O) port is above an overvoltage threshold;

generating a control signal based on the overvoltage indicating signal; and enabling or disabling a shunting of current produced by the voltage from the I/O port to a voltage rail based on the control signal, wherein generating the control signal comprises initializing the control signal to a first state based on the voltage at the I/O port, and setting the control signal to a second state in response to the overvoltage indicating signal.

21. The method of claim 20, wherein generating the overvoltage indicating signal comprises applying the voltage across a set of one or more diodes coupled in series with a resistive device between I/O port and the voltage rail.

22. The method of claim 20, further comprising generating a supply voltage for generating the control signal based on the voltage at the I/O port.

23. The method of claim 22, wherein generating the supply voltage comprises applying the voltage at the I/O port across a diode coupled in series with a capacitor between the I/O port and the voltage rail.

24. The method of claim 20, wherein enabling or disabling the shunting of the current, comprises:

disabling the shunting of the current based on the first state of the control signal; or enabling the shunting of the current based on the second state of the control signal.

25. An apparatus, comprising:

means for generating an overvoltage indicating signal indicating whether a voltage at an input/output (I/O) port is above an overvoltage threshold;

means for generating a control signal based on the overvoltage indicating signal; and means for enabling or disabling a shunting of current produced by the voltage from the I/O port to a voltage rail based on the control signal, wherein the means for generating the control signal comprises means for initializing the control signal to a first state based on the voltage at the I/O port, and means for setting the control signal to a second state in response to the overvoltage indicating signal.

26. The apparatus of claim 25, further comprising means for generating a supply voltage based on the voltage at the I/O port, wherein the means for generating the control signal is coupled to the means for generating the supply voltage.

* * * * *